(12) United States Patent
Misumi et al.

(10) Patent No.: US 10,695,752 B2
(45) Date of Patent: Jun. 30, 2020

(54) EXHAUST-GAS PURIFYING CATALYST AND MANUFACTURING METHOD THEREFOR

(71) Applicant: CATALER CORPORATION, Kakegawa-shi, Shizuoka (JP)

(72) Inventors: Takara Misumi, Kakegawa (JP); Satoshi Matsueda, Kakegawa (JP)

(73) Assignee: CATALER CORPORATION, Kakegawa-shi (JP)

( * ) Notice: Subject to any disclaimer, the term of this patent is extended or adjusted under 35 U.S.C. 154(b) by 0 days.

(21) Appl. No.: 16/079,338

(22) PCT Filed: Feb. 23, 2017

(86) PCT No.: PCT/JP2017/006936
§ 371 (c)(1),
(2) Date: Aug. 23, 2018

(87) PCT Pub. No.: WO2017/146175
PCT Pub. Date: Aug. 31, 2017

(65) Prior Publication Data
US 2019/0060876 A1 Feb. 28, 2019

(30) Foreign Application Priority Data
Feb. 25, 2016 (JP) ................. 2016-034789

(51) Int. Cl.
*B01J 23/63* (2006.01)
*B01D 53/94* (2006.01)
(Continued)

(52) U.S. Cl.
CPC ............. *B01J 23/63* (2013.01); *B01D 53/94* (2013.01); *B01J 35/0006* (2013.01);
(Continued)

(58) Field of Classification Search
CPC ...... B01J 23/63; B01J 35/0006; B01J 35/023; B01J 37/0244; F01N 3/101
See application file for complete search history.

(56) References Cited

U.S. PATENT DOCUMENTS

2011/0113754 A1   5/2011  Kohara et al.
2011/0252773 A1*  10/2011  Arnold ............... B01D 46/2429
                                                         60/297
(Continued)

FOREIGN PATENT DOCUMENTS

EP    2298444 A1    3/2011
JP    2011-212641 A  10/2011
(Continued)

OTHER PUBLICATIONS

Jun. 13, 2019 extended Search Report issued in European Patent Application No. 17756613.0.
(Continued)

*Primary Examiner* — Melvin C. Mayes
*Assistant Examiner* — Michael Forrest
(74) *Attorney, Agent, or Firm* — Oliff PLC

(57) ABSTRACT

An exhaust-gas purifying catalyst includes a lower layer containing ceria-based oxide particles and an upper layer containing metal oxide particles and a precious metal supported on the metal oxide particles, wherein the exhaust-gas purifying catalyst is characterized in that the Rh content of the lower layer is equal to or less than 0.25 g/L, and also that the particle-size distribution of the ceria-based oxide particles in the lower layer, which is obtained by scanning electron microscopy, has a first peak in which the peak top thereof is in a region of 0.90-6.50 μm and a second peak in which the peak top thereof is in a region of 9.50-34.0 μm.

9 Claims, 2 Drawing Sheets

(51) Int. Cl.
  *B01J 37/02*    (2006.01)
  *F01N 3/10*    (2006.01)
  *B01J 35/00*    (2006.01)
  *B01J 35/02*    (2006.01)

(52) U.S. Cl.
  CPC ............ *B01J 35/023* (2013.01); *B01J 37/02* (2013.01); *B01J 37/0244* (2013.01); *F01N 3/10* (2013.01); *F01N 3/101* (2013.01)

(56) References Cited

U.S. PATENT DOCUMENTS

| | | |
|---|---|---|
| 2015/0273462 A1 | 10/2015 | Iwakura et al. |
| 2016/0288096 A1 | 10/2016 | Fujiwara et al. |

FOREIGN PATENT DOCUMENTS

| | | |
|---|---|---|
| JP | 2015-85241 A | 5/2015 |
| JP | 2015-093267 A | 5/2015 |
| WO | 2012/120349 A1 | 9/2012 |
| WO | 2015/037613 A1 | 3/2015 |

OTHER PUBLICATIONS

Apr. 4, 2017 International Search Report issued in International Patent Application PCT/JP2017/006936.
Apr. 4, 2017 Written Opinion issued in International Patent Application PCT/JP2017/006936.

\* cited by examiner

EXHAUST-GAS PURIFYING CATALYST AND MANUFACTURING METHOD THEREFOR

FIELD

The present invention relates to an exhaust gas purification catalyst and a manufacturing method therefor.

BACKGROUND

As an exhaust gas purification catalyst for purifying the exhaust gas of automobiles, three-way catalysts in which a precious metal is supported on an inorganic oxide are known. Three-way catalysts which can efficiently remove hydrocarbons (HC), nitrogen oxides ($NO_x$), and carbon monoxide (CO) at the same time are widely used. Exhaust gas purification catalysts represented by three-way catalysts often contain rhodium (Rh), which is excellent in $NO_x$ purification activity.

The exhaust gas removal performance of an exhaust gas purification catalyst is most efficient at the stoichiometric air-fuel ratio (also referred to as the "stoich") around the air-fuel ratio of 14.6. However, automobiles do not always run at an air-fuel ratio near the stoich. It is known that exhaust gas purification performance tends to deteriorate when the air-fuel ratio fluctuates under the control of an engine and the exhaust gas composition (atmosphere) changes accordingly.

In order to alleviate the atmospheric fluctuation of an exhaust gas, it is common to include a ceria component, which has a function of occluding and releasing oxygen, in the exhaust gas purification catalyst. In particular, an exhaust gas purification catalyst containing this ceria component as a ceria-zirconia composite oxide (CZ) is known.

For example, Patent Literature 1 describes an exhaust gas purification catalyst in which Rh is supported on a plurality of types of CZ particles having different particle sizes.

The technology of Patent Literature 1 attempts to prevent the peeling of a catalyst layer from a substrate by using large and small CZ particles in combination, whereby the small particles enter into gaps between the large particles and the contact area between particles as well as between the particles and the substrate increases (FIG. 1).

Conventionally, catalyst layers in exhaust gas purification catalysts as described above have been formed on a substrate which itself has no exhaust gas purification capability, for example, a honeycomb substrate made of cordierite. However, in recent years, exhaust gas purification catalysts in which a precious metal is supported on a substrate composed of inorganic oxide particles have been proposed (Patent Literature 2).

CITATION LIST

Patent Literature

[PATENT LITERATURE 1] JP 2011-212641 A
PATENT LITERATURE 2] JP 2015-85241 A

SUMMARY

Technical Problem

For vehicles, the tendency towards low fuel consumption is becoming stronger and stronger. Therefore, vehicle control for low fuel consumption, such as idling stop, fuel cutoff, or the like, is carried out. Regulatory standards for exhaust gases are becoming stricter year by year in all countries. Thus, there is a demand for an exhaust gas purification catalyst capable of responding to a sudden change in atmosphere from a lean atmosphere to a rich atmosphere when, for example, re-accelerating after an idling stop or fuel cutoff in vehicles with low fuel consumption control.

However, the atmospheric change in the exhaust gas of the vehicle may vary not only from lean to rich as described above but also depending on road conditions and traffic conditions. Thus, an exhaust gas purification catalyst capable of adjusting in accordance with the atmosphere in various actual situations the vehicle may encounter is desired.

The object of the present invention, which has been made in view of the above problems, is to provide an exhaust gas purification catalyst which is excellent in exhaust gas (in particular, $NO_x$) purification performance and which can respond to various changes in the exhaust gas atmosphere, and a method for manufacturing the same.

Means to Solve Problems

The present invention is summarized as follows.

[1] An exhaust gas purification catalyst, comprising a lower layer containing ceria-based oxide particles and an upper layer containing metal oxide particles and a precious metal supported on the metal oxide particles, wherein the Rh content of the lower layer is not more than 0.25 g/L, and
a particle-size distribution of the ceria-based oxide particles in the lower layer, as obtained by scanning electron microscopy, has a first peak in which a peak top thereof is in a region of 0.90 to 6.50 μm and a second peak in which the peak top thereof is in a region of 9.50 to 34.0 μm.

[2] The exhaust gas purification catalyst according to [1], wherein the metal oxide particles in the upper layer are ceria-based oxide particles having an average particle diameter of 0.75 μm to 5.5 μm.

[3] The exhaust gas purification catalyst according to [1] or [2], wherein the precious metal included in the upper layer is Rh.

[4] The exhaust gas purification catalyst according to any one of [1] to [3], wherein the lower layer further comprises Pd.

[5] The exhaust gas purification catalyst according to [4], wherein the Pd is supported on the ceria-based oxide particles associated with the first peak.

[6] The exhaust gas purification catalyst according to any one of [1] to [5], wherein the lower layer is formed on a substrate.

[7] The exhaust gas purification catalyst according to any one of [1] to [5], wherein the lower layer constitutes a part of the substrate and the upper layer is on the substrate.

[8] A method for the production of an exhaust gas purification catalyst, comprising the steps of:
forming, on a substrate, a lower layer containing first ceria-based oxide particles having a peak top in a region of 0.90 to 6.50 μm and second ceria-based oxide particles having a peak top in the region of 9.50 to 34.0 μm, in a particle diameter distribution obtained by scanning electron microscopy, and
forming an upper layer containing metal oxide particles and a precious metal supported on the metal oxide particles.

[9] A method for the production of an exhaust gas purification catalyst, comprising the steps of:
forming a substrate,
forming, on the substrate, an upper layer containing metal oxide particles and a precious metal supported on the metal oxide particles, wherein
a part or all of the substrate is composed of a lower layer containing first ceria-based oxide particles having a peak top in a region of 0.90 to 6.50 μm and second ceria-based oxide particles having a peak top in the region of 9.50 to 34.0 μm, in a particle diameter distribution obtained by scanning electron microscopy.

Advantageous Effects of Invention

According to the present invention, an exhaust gas purification catalyst having an exhaust gas, in particular $NO_X$, purification performance and which can respond to various changes in the exhaust gas atmosphere and a method for manufacturing the same are provided.

DESCRIPTION OF EMBODIMENTS

The present invention will be described in detail below.

The exhaust gas purification catalyst of the present invention includes a lower layer having ceria-based oxide particles and an upper layer having metal oxide particles and a precious metal supported on the metal oxide particles. The ceria-based oxide particles of the lower layer include first ceria-based oxide particles with small particle size having a particle size distribution peak top in the region of 0.90 to 6.50 μm and second ceria-based oxide particles with large particle size having a particle size distribution peak top in the region of 9.50 to 34.0 μm. The Rh content of the lower layer is 0.25 g/L or less.

The exhaust gas purification catalyst of the present invention may have the lower layer and the upper layer on a substrate, or the lower layer may constitute a part of the substrate and the upper layer may be on the substrate. When the lower layer constitutes a part of the substrate, the lower layer may constitute a wall surface of the substrate.

In the exhaust gas purification catalyst of the present invention, "upper layer" refers to the layer located on the upper side of the exhaust gas purification catalyst when the vertical direction is determined considering the surface which is directly contacted by the exhaust gas flow as the uppermost layer. "Lower layer" refers to the layer located below the upper layer in the vertical direction. For example, the exhaust gas purification catalyst having a substrate may have the lower layer "on" the substrate and the upper layer "on" the lower layer.

Figure 1:
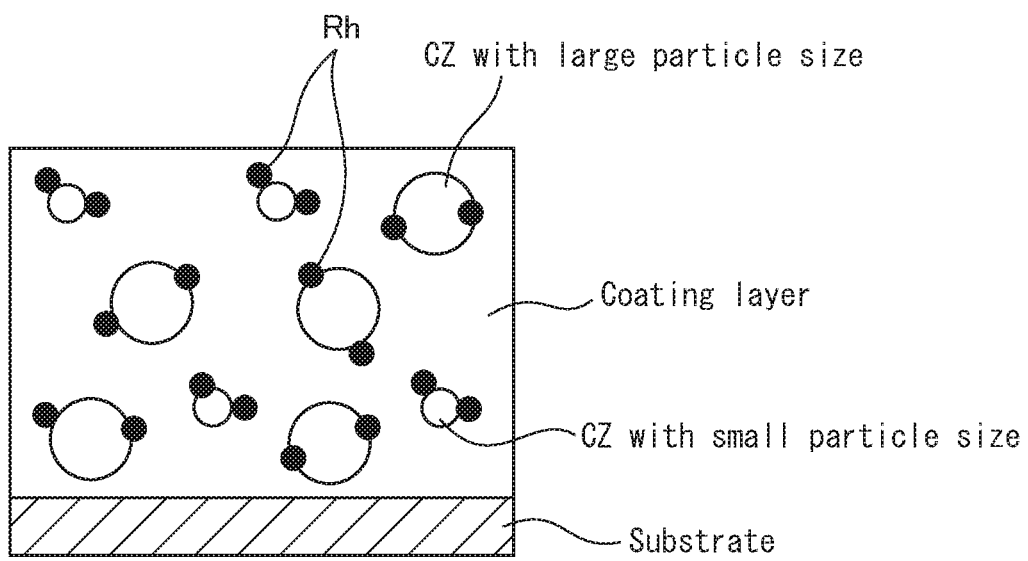
FIG. 1 is a schematic view detailing the configuration of the catalyst described in Patent Literature 1.
Figure 2:
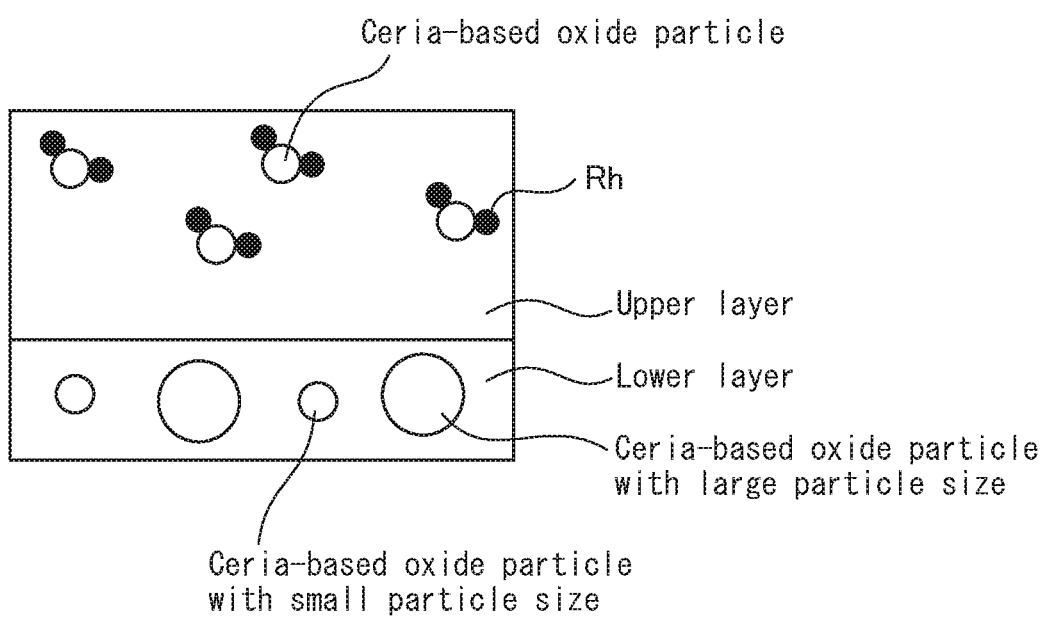
FIG. 2 is a schematic view detailing the configuration of the exhaust gas purification catalyst of the present invention.
Figure 3:
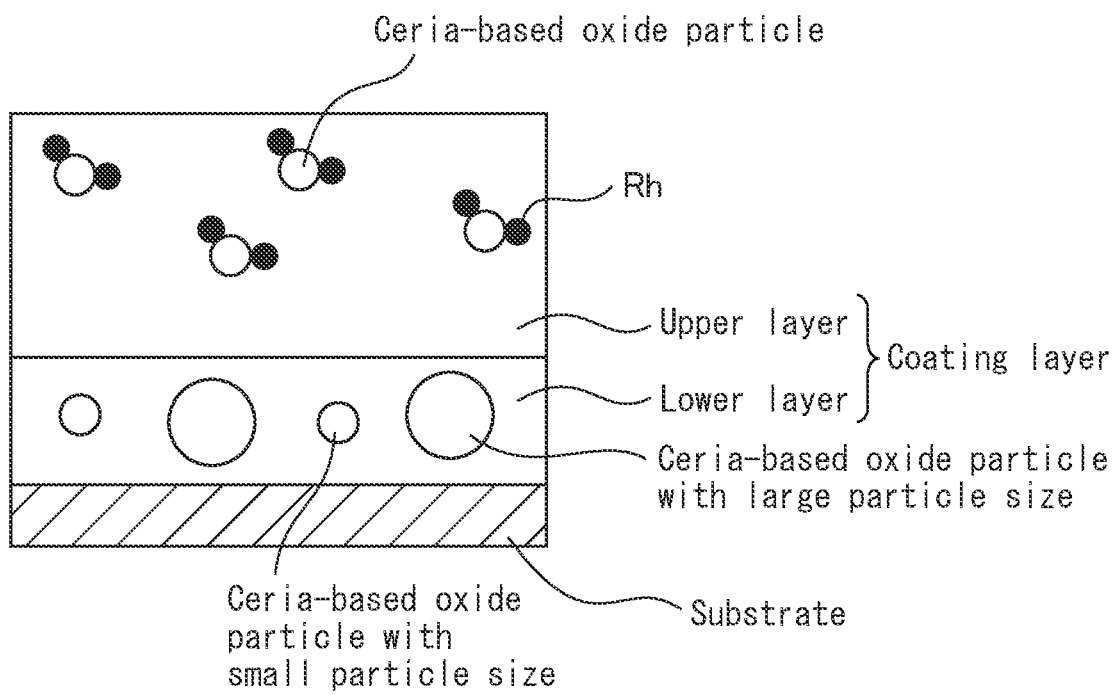
FIG. 3 is a schematic view detailing an example of an embodiment of the exhaust gas purification of the present invention.
Figure 4:
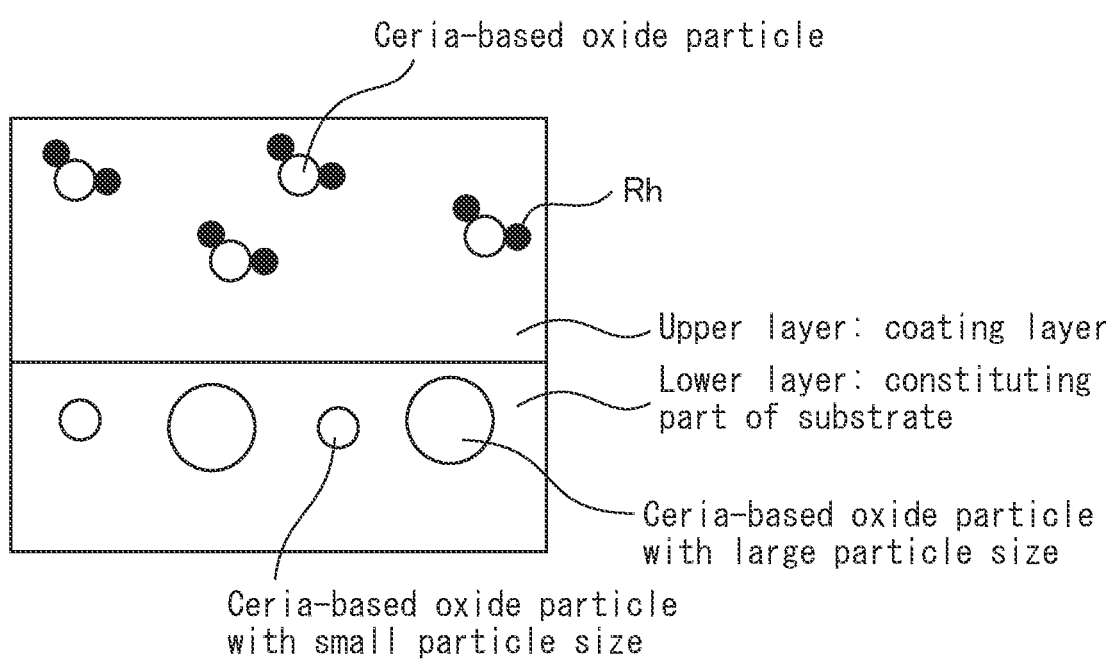
FIG. 4 is a schematic view detailing another example of an embodiment of the exhaust gas purification catalyst of the present invention.

FIGS. 2 to 4 are schematic views detailing the configuration of the exhaust gas purification catalyst of the present invention.

The exhaust gas purification catalyst of FIG. 2 has a lower layer including ceria-based oxide particles and an upper layer including metal oxide particles and a precious metal supported on the metal oxide particles. The lower layer includes first ceria-based oxide particles with small particle size and second ceria-based oxide particles with large particle size. The upper layer includes ceria-based oxide particles as the metal oxide particles on which the Rh, as the precious metal, is supported.

FIG. 3 is an example when the lower layer and upper layer of FIG. 2 are arranged on a substrate. In this case, the lower layer and the upper layer may each be a coating layer.

FIG. 4 is an example when the lower layer of FIG. 2 constitutes a part of the substrate. In this case, the upper layer may be a coating layer.

By configuring the exhaust gas purification catalyst of the present invention as described above, excellent exhaust gas (in particular, $NO_X$) purification performance can be obtained and it is possible to respond to various changes in the exhaust gas atmosphere. Though the present invention is not bound by any particular theory, it is inferred that the mechanism of action of the remarkable effect of the catalyst of the present invention is brought about as follows.

The precious metal supported on the metal oxide particles (e.g., the ceria-based oxide particles) present in the upper layer of the exhaust gas purification catalyst of the present invention functions as an activation point for exhaust gas purification. Since, for example, a configuration similar to known exhaust gas purification catalyst can be adopted for this upper layer, when the atmosphere is near the stoich in normal operation, the upper layer exhibits the same function as the known exhaust gas purification catalyst.

However, in high load operations under rich and high temperature conditions, the oxygen supply amount is insufficient in the known catalyst consisting only of the upper layer, whereby it is difficult to effectively mitigate the atmosphere. However, ceria-based oxide particles with large particle size are present in the lower layer of the exhaust gas purification catalyst of the present invention. Thus, oxygen can be released over a long period of time, even in high load operations.

Furthermore, when, for example, the atmosphere changes suddenly from a lean atmosphere to a rich atmosphere, such as re-acceleration after an idling stop, or fuel shutoff, in vehicles with low fuel consumption control, it is necessary that the required amount of oxygen be supplied quickly, which again is difficult to respond to with only an upper layer. In this connection, since ceria-based oxide particles with small particle size are present in the lower layer of the exhaust gas purification catalyst of the present invention, whereby oxygen can be released quickly when the atmosphere suddenly changes, it is possible to supply oxygen to the upper layer.

In the exhaust gas purification catalyst of the present invention, the amount of Rh in the lower layer is limited. In other words, a significant amount of Rh is not supported on either the ceria-based oxide particles with large particle size or small particle size present in the lower layer. Therefore, for example, during normal operation, the oxidation of Rh by the oxygen released slowly from the ceria-based oxide particles with large particle size can be prevented, and high exhaust gas purification performance, in particular $NO_X$ purification performance, can be sustained for a long time.

Each of the components of the exhaust gas purification catalyst of the present invention will be described below.

<Substrate>

A substrate which is commonly used for exhaust gas purification catalysts can be used as the substrate of the exhaust gas purification catalyst of the present invention. For example, a monolithic honeycomb substrate may be used.

As the material constituting the substrate, for example, cordierite, SiC, stainless steel, or metal oxide particles may be used. The volume of the substrate can be, for example, about 1 L.

When the lower layer constitutes a part of the substrate, for example, the lower layer may be configured of metal oxide particles. The metal oxide particles may include first ceria-based oxide particles with small particle size and second ceria-based oxide particles with large particle size.

<Lower Layer>

The lower layer includes ceria-based oxide particles.

[Ceria-Based Oxide Particles]

The oxide constituting the ceria-based oxide particles of the lower layer may be composed of only ceria or may be a composite oxide of ceria and another metal oxide. The metal oxide is preferably a ceria-zirconia-based composite oxide (CZ) including cerium (Ce) and zirconium (Zr) as metal elements.

The oxide constituting the above-described ceria-based oxide particles is particularly preferably a composite oxide including Zr, Ce and a rare-earth element (Ln) excluding Ce, and more preferably is a composite oxide including Zr, Ce, and one or more rare-earth element selected from Y, La, Pr, Nd, and Eu.

When the ceria-based oxide of the lower layer is a ceria-zirconia-based composite oxide, the preferable ratio of each metal element contained in the composite oxide is as follows in terms of the oxide equivalent values when the total mass of the composite oxide is 100% by mass:

Zr: 95% by mass or less in terms of $ZrO_2$
Ce: 1% by mass to 90% by mass, in terms of $CeO_2$
Rare-earth elements excluding Ce: 1% by mass to 20% by mass, in terms of $Ln_2O_3$.

The particle size distribution of the ceria-based oxide particles obtained by measuring the lower layer of the exhaust gas purification catalyst of the present invention with a scanning electron microscope includes a first peak having a peak top in the region of 0.90 to 6.50 μm and a second peak having a peak top in the region of 9.50 to 34.0 μm.

When the total mass of the composite oxide is 100% by mass, the content of Zr in terms of $ZrO_2$ is more preferably 5 to 90% by mass, further preferably 10 to 85% by mass, and particularly preferably 20 to 80% by mass.

When the total mass of the composite oxide is 100% by mass, the content of the Ce in terms of $CeO_2$ is more preferably 2 to 80% by mass, further preferably 5 to 70% by mass, and particularly preferably 10 to 60% by mass.

The ceria-based oxide particles of the lower layer of the exhaust gas purification catalyst of the present invention may be solid particles (for example, pyrochlore-type ceria-zirconia-based composite oxide particles), may be hollow particles, or may be porous particles.

The particle size distribution of the ceria-based oxide particles obtained by measuring the lower layer of the exhaust gas purification catalyst of the present invention with a scanning electron microscope includes a first peak having a peak top in the region of 0.90 to 6.50 μm and a second peak having a peak top in the region of 9.50 to 35.0 μm.

In other words, the lower layer of the exhaust gas purification catalyst of the present invention includes two types of ceria-based oxide particles having different particle sizes, i.e., ceria-based oxide particles belonging to the first peak (small particle size particles) and second ceria-based oxide particles belonging to the second peak (large particle size particles).

(First Ceria-Based Oxide Particles (Small Particle Size Particles))

When the first ceria-based oxide particles described above are excessively small, the filling state thereof becomes too dense, and it becomes difficult for the gas to circulate. In consideration thereof, the peak top of the first peak attributed to the first ceria-based oxide particles is 0.90 μm or more, preferably 0.93 μm or more, more preferably 0.85 μm or more, further preferably 0.90 μm or more, particularly preferably 0.95 μm or more, and especially preferably 1.0 μm or more. Conversely, from the viewpoint of ensuring a good atmosphere relaxation property and desirable quickly terminating oxygen release to such an extent that an active reduction of Rh can be promptly generated when the atmosphere suddenly changes from lean to rich, the peak top of the first peak is preferably 6.50 μm or less, preferably 5.50 μm or less, more preferably 5.25 μm or less, further preferably 5.00 μm or less, particularly preferably 4.75 μm or less, and especially preferably 4.50 μm or less.

It is particularly preferable that the first ceria-based oxide particles attributed to this first peak top be porous ceria-zirconia-based composite oxide particles.

(Second Ceria-Based Oxide Particles (Large Particle Size Particles))

From the viewpoint of exhibiting good atmospheric relaxation during high load operations, the peak top of the second peak attributed to the second ceria-based oxide particles is 9.50 μm or more, preferably 9.75 μm or more, more preferably 10.0 μm or more, further preferably 12.5 μm or more, particularly preferably 15.0 μm or more, and especially preferably 17.5 μm or more. Conversely, from the viewpoint of the suppression of peeling of the coating layer, the second peak top is 34.0 μm or less, preferably 32.5 μm or less, more preferably 30.0 μm or less, further preferably 27.5 μm or less, particularly preferably 25.0 μm or less, and especially preferably 22.5 μm or less.

It is particularly preferable that the second ceria-based oxide particles belonging to this second peak top be pyrochlore-type ceria-zirconia-based composite oxide particles.

(Usage Ratio of the First and Second Ceria-Based Oxide Particles)

The proportion of the first ceria-based oxide particles and the second ceria-based oxide particles present in the lower layer of the exhaust gas purification catalyst of the present invention is arbitrary. However, from the viewpoint of improving the Rh-reducing property at the time of sudden change from a lean atmosphere to a rich atmosphere, the first ceria mass ratio with respect to the total of the first ceria-based oxide particles and the second ceria-based oxide particles is preferably 15% by mass or more, more preferably 30% by mass or more, further preferably 35% by mass or more, and particularly preferably 40% by mass or more. Conversely, from the viewpoint of enhanced atmospheric relaxation during high load operations, this value is preferably 85% by mass or less, more preferably 70% by mass or less, further preferably 65% by mass or less, and particularly preferably 60% by mass or less.

[Other Oxide Particles]

The lower layer of the exhaust gas purification catalyst of the present invention may include, as the metal oxide particles, only the first ceria-based oxide particles and the second ceria-based oxide particles or may include oxide particles other than these. Examples of the other oxide particles that can be used include alumina, silica, titania, or alkaline earth metal oxides.

The average particle diameter of the other oxide particles is preferably 0.01 μm to 30.0 μm, more preferably 0.05 μm to 25.0 μm.

The content ratio of the other oxide particles in the lower layer of the exhaust gas purification catalyst of the present invention is preferably, as a mass ratio with respect to the total amount of oxide particles included in the lower layer, 75% by mass or less, from the viewpoint of not diminishing the effect of the present invention. This value is, on the above-described basis, more preferably 60% by mass or less, further preferably 50% by mass or less, and particularly preferably 40% by mass or less.

It is preferable that the lower layer of the exhaust gas purification catalyst of the present invention include alumina as the other oxide particles since the advantage of a higher heat resistance can be obtained. In this case, it is preferable that the content of alumina in the lower layer be 10% by mass or more on the above basis so as to effectively exhibit the effect of the addition of alumina. This value is, on the above basis, more preferably 15% by mass or more, and further preferably 20% by mass or less.

[Precious Metal]

Though it is not necessary that the lower layer of the exhaust gas purification catalyst of the present invention include a precious metal, a precious metal may be included therein. The precious metal which can be included in the lower layer may be, for example, Rh, Pd, or Pt. However, from among these, the content of Rh in the lower layer expressed as the mass of Rh per L of substrate capacity is preferably maintained at 0.25 g/substrate-L or less. Since the second ceria-based oxide particles having a relatively large particle diameter are present in the lower layer, if a significant amount of Rh is present in the vicinity thereof, the reducing property of Rh is imparted when suddenly changing from lean to rich. The content of Rh in the lower layer is preferably 0.20 g/substrate-L or less, more preferably 0.15 g/substrate-L or less, further preferably 0.10 g/substrate-L or less, particularly preferably 0.05 g/substrate-L or less, and is most preferably not included in the lower layer.

The precious metal of the lower layer is preferably selected from Pd and Pt and is more preferably Pd.

In order to enhance at least one of the HC purification property and the CO purification property, the content of the precious metal in the lower layer is preferably 0.01 g/substrate-L or more, more preferably 0.05 g/substrate-L or more, further preferably 0.10 g/substrate-L or more, and particularly preferably 0.15 g/substrate-L or more. Conversely, in order to avoid excessive cost, the content is preferably 1.0 g/substrate-L or less, more preferably 0.50 g/substrate-L or less, further preferably 0.40 g/substrate-L or less, and particularly preferably 0.35 g/substrate-L or less.

The precious metal of the lower layer is preferably supported on at least one of the first ceria-based oxide particles and the second ceria-based oxide particles, more preferably on the first ceria-based oxide particles.

[Other Components]

The lower layer of the exhaust gas purification catalyst of the present invention may include, in accordance with technical need, components other than the first ceria-based oxide particles, the second ceria-based oxide particles, and the other optionally-used oxide particles. As this other component, for example, a binder, a transition metal, an alkali metal compound, an alkaline earth metal compound, or a rare-earth compound can be used.

(Binder)

The binder has a function of imparting mechanical strength to the coating layer of the exhaust gas purification catalyst of the present invention by bonding between components as well as between each component and the substrate or another layer. As the binder, for example, alumina sol, zirconia sol, silica sol, or titania sol can be used.

When the total mass of the lower layer is 100% by mass, the usage ratio of the binder in the lower layer of the exhaust gas purification catalyst of the present invention is preferably 20% by mass or less, more preferably 0.5 to 10% by mass.

(Transition Metal, Alkali Metal Compound, and Alkaline Earth Metal Compound)

Examples of the transition metal include nickel, copper, manganese, iron, cobalt, and zinc. From among these, when nickel is used in combination, an effect of suppressing the formation of hydrogen sulfide is obtained. Examples of the alkali metal compound include potassium compounds and lithium compounds; examples of the alkaline earth metal compound include calcium compounds, barium compounds, and strontium compounds; and examples of the rare earth compound include lanthanum oxide, praseodymium oxide, and neodymium oxide. These have the effect of improving the heat resistance of the obtained catalyst.

By including an alkaline earth metal sulfate in the lower layer of the exhaust gas purification catalyst of the present invention, stabilization of the oxide state of Rh in the upper layer tends to be suppressed. The alkaline earth metal sulfate is preferably selected from barium sulfate and strontium sulfate. The content of the alkaline earth metal sulfate in the lower layer is preferably 5% by mass to 100% by mass, more preferably 10% by mass to 50% by mass, and further preferably 15% by mass to 30% by mass, with respect to the total mass of the oxide particles in the lower layer.

[Amount of Lower Layer]

From the view point of efficiently exhibiting the oxygen absorption/release capacity of the ceria-based composite oxide, the amount of the lower layer in the exhaust gas purification catalyst of the present invention is preferably 50 g/substrate-L or more, more preferably 75 g/substrate-L or more, further preferably 100 g/substrate-L or more, and particularly preferably 125 g/substrate-L or more. Conversely, from the viewpoint of reducing pressure loss, the amount of the lower layer is preferably 500 g/substrate-L or less, more preferably 300 g/substrate-L or less, further preferably 275 g/substrate-L or less, and particularly preferably 250 g/substrate-L or less. When the lower layer is formed as a coating layer on the substrate, the above amount may be the coating amount.

<Upper Layer>

The upper layer includes metal oxide particles and a precious metal supported on the metal oxide particles.

[Precious Metal]

The precious metal of the upper layer can be selected from, for example, Rh, Pd, or Pt. However, in order to maximize the effects of the present invention in which the atmospheric relaxation during high load operations and the precious metal reducibility at the sudden change of the atmosphere from lean to rich, Rh is preferably used as the precious metal of the upper layer.

From the viewpoint of ensuring preferably exhaust gas purification performance (in particular, $NO_X$ purification performance), the content of the precious metal (in particular, Rh) in the upper layer of the exhaust gas purification catalyst of the present invention is preferably 0.01 g/substrate-L or more, more preferably 0.05 g/substrate-L or more, further preferably 0.10 g/substrate-L or more, and particularly preferably 0.15 g/substrate-L or more. Conversely, in order to avoid excessive cost, the content is preferably 1.0 g/substrate-L or less, more preferably 0.75 g/substrate-L or less, further preferably 0.50 g/substrate-L or less, and particularly preferably 0.35 g/substrate-L or less.
(Oxide Particles)

The precious metal of the upper layer is supported on oxide particles. These oxide particles are preferably ceria-based oxide particles. The details of the oxide constituting the ceria-based oxide particles which support the precious metal of the upper layer are the same as the ceria-based oxide particles of the lower layer described above. When the precious metal of the upper layer is specifically Rh, by supporting and including such ceria-based oxide particles, a good atmospheric relaxation property can be obtained.

From the viewpoint of improving atmospheric relaxation, the particle size of the ceria-based oxide particles which support the precious metal in the upper layer is preferably greater than 0.5 µm, more preferably 0.75 µm or more, further preferably 0.80 µm or more, particularly preferably 0.85 µm or more, and especially preferably 0.90 µm or more. Conversely, from the viewpoint of quickly ending oxygen release when the atmosphere suddenly changes from lean to rich and the suppression of oxidation of the precious metal, the particle size of the ceria-based oxide particles in the upper layer is preferably less than 6 µm, more preferably 5.5 µm or less, further preferably 5.3 µm or less, particularly preferably 5.2 µm or less, and especially preferably 5.0 µm or less.

[Other Oxide Particles]

The upper layer of the exhaust gas purification catalyst of the present invention may include, as the oxide particles, only the above ceria-based oxide particles or may include other oxide particles aside from the above ceria-based oxide particles. The types, particle size, and usage ratios of these other oxide particles are the same as those described above for the other oxide particles of the lower layer.

[Other Components]

The upper layer of the exhaust gas purification catalyst of the present invention may include, in accordance with technical need, components other than the precious metal, the ceria-based oxide particles, and the other optionally-used oxide particles. These other components are the same as the other components describe above for the other components of the lower layer.

[Upper Layer Amount]

From the viewpoint that the reactivity with the exhaust gas should be sufficiently high, the amount of the upper layer in the exhaust gas purification catalyst of the present invention is preferably 10 g/substrate-L or more, more preferably 25 g/substrate-L or more, further preferably 50 g/substrate-L or more, and particularly preferably 75 g/substrate-L or more. Conversely, from the viewpoint that pressure loss should be reduced, the amount of the upper layer is preferably 500 g/substrate-L or less, more preferably 250 g/substrate-L or less, further preferably 200 g/substrate-L or less, and particularly preferably 175 g/substrate-L or less. The upper layer may be a coating layer.

<Method for Producing Exhaust Gas Purification Catalyst>

The method for producing the exhaust gas purification catalyst of the present invention is not particularly limited as long as the above characteristics are exhibited thereby. However, for example, any of the production methods below can be used.

[First Production Method]

The method includes:
a step (lower layer forming step) of forming, on a substrate, a lower layer containing first ceria-based oxide particles having a peak top in a region of 0.90 to 6.50 µm and second ceria-based oxide particles having a peak top in the region of 9.50 to 34.0 µm, in a particle diameter distribution obtained by scanning electron microscopy, and
a step (upper layer forming step) of forming an upper layer containing metal oxide particles and a precious metal supported on the metal oxide particles.

[Second Production Method]

The method includes:
a step (substrate forming step) of forming a substrate,
a step (upper layer forming step) of forming, on the substrate, an upper layer containing metal oxide particles and a precious metal supported on the metal oxide particles, wherein
a part or all of the substrate is composed of a lower layer containing first ceria-based oxide particles having a peak top in a region of 0.90 to 6.50 µm and second ceria-based oxide particles having a peak top in the region of 9.50 to 34.0 µm, in a particle diameter distribution obtained by scanning electron microscopy.

According to the first production method of the present invention, an exhaust gas purification catalyst comprising a lower layer and an upper layer on a substrate can be obtained. According to the second production method, an exhaust gas purification catalyst including a lower layer which constitutes a part of the substrate and an upper layer on the substrate can be obtained. The first and second production methods will be sequentially described below.

1. First Production Method

[Substrate]

The substrate used in the first production method of the present invention can be selected from desirable substrates which should be included in exhaust gas purification catalyst. For example, a monolithic honeycomb substrate composed of cordierite or metal oxide particles, as described above, can be used.

[Lower Layer Forming Step]

The lower layer can be formed by applying a coating solution (lower layer slurry) containing the material of the lower layer or a precursor thereof on the substrate, removing the solvent as necessary, and then heating and drying.

Since the lower layer includes first ceria-based oxide particles and second ceria-based oxides particles each having specific particle diameters, the lower layer slurry also includes these particles at a predetermined ratio. The first ceria-based oxide particles and the second ceria-based oxide particles used can be selected as described above.

To obtain a precious metal, preferably Pd, supported on these ceria-based oxide particles, these oxide particles can be immersed in a solution containing a Pd precursor and then heated.

For example, a water-soluble Pd salt is preferably used as the above Pd precursor. As specific examples thereof, palladium nitrate, palladium chloride, or palladium sulfate can be used. Since metal Pd having good dispersibility is formed thereby, palladium nitrate is preferable. Water is preferable as the solvent of the Pd precursor solution. The Pd concentration in the Pd precursor solution should be appropriately selected in accordance with the desired Pd support amount in the obtained catalyst. The concentration in terms of $PdO_2$ can be, for example, 0.1 to 20 g/L, preferably 0.15 to 15 g/L.

The temperature of the liquid when the ceria-based oxide particles are immersed in the Pd precursor solution can be, for example 5 to 90° C., preferably 25 to 60° C. The duration of immersion can be, for example, 1 minute to 6 hours, preferably 10 minutes to 1 hour.

Next, after immersion the ceria-based oxide particles are preferably heated in a reducing atmosphere. The Pd precursor can be converted to Pd metal by this heating step.

The reducing atmosphere at this time can be formed by a reducing gas or a mixed gas of a reducing gas and an inert gas. As the reducing gas, for example, carbon monoxide (CO), hydrogen, or hydrogen sulfide can be used; as the inert gas, for example, nitrogen, helium, or argon can be used.

The heating temperature of the heating step is preferably 800 to 1,200° C., more preferably 850 to 1,100° C., and further preferably 900 to 1,050° C. The heating duration is preferably 0.5 to 48 hours, more preferably 0.75 to 36 hours, and particularly preferably 1 to 24 hours.

A lower layer slurry containing the first ceria-based oxide particles and the second ceria-based oxide particles is prepared. The precious metal may be supported on these ceria-based particles if necessary, as described above.

In addition to the first ceria-based oxide particles and the second ceria-based oxide particles at a predetermined ratio, the optional components described above can be included in the lower layer slurry. The lower layer slurry of the present invention preferably includes a predetermined amount of a binder as an optional component. Water is preferable as the solvent of the lower layer slurry.

The solid concentration of the lower layer slurry can be, for example, 5 to 60% by weight, preferably 10 to 40% by weight.

Preparation of the lower lay slurry can be carried out by suspending each of the above components in a solvent by an appropriate method. For this suspension process, a known mixing device such as, for example, a mixing impeller-type or blade-type mixing device, or a mixer can be used.

The lower layer slurry prepared as described above is applied onto the surface of the substrate, the solvent is removed if necessary, and then heated and dried, whereby the lower layer can be formed.

As the coating method, a known method such as an immersion method or a pouring method can be employed without limitation. The coating amount can be appropriately selected in accordance with the desired amount of the coating layer.

The removal of the solvent after coating can be carried out by heating method at a temperature of, for example, 60 to 200° C., preferably 120 to 150° C., for, for example, 5 to 120 minutes, preferably 10 to 60 minutes. Ambient air is sufficient as the atmosphere during heating.

[Upper Layer Forming Step]

As described above, the precious metal of the upper layer is supported on the oxide particles. Thus, a coating liquid for forming the upper layer (upper layer slurry) includes the oxide particles (preferably ceria-based oxide particles) on which the precious metal (preferably Rh) is supported.

When ceria-based oxide particles are used as the oxide particles of the upper layer, the ceria-based oxide particles which support the precious metal can be prepared in the same manner as the preparation of the ceria-based oxide particles which support the Pd of the lower layer except that the desired precious metal precursor is used.

Rh is preferable as the precious metal of the upper layer. For example, a water-soluble Rh salt can be appropriately used as the Rh precursor for use in the preparation of the ceria-based oxide particles which support the precious metal. For example, rhodium chloride, sodium rhodium chloride, rhodium chloride pentaamine, or carbonyl acetyl rhodium can be used. Rhodium chloride is preferred from the viewpoint of high dispersibility in the carrier.

In the upper layer forming step, first, the upper layer slurry containing the ceria-based oxide particles which support the precious metal is prepared as described above.

In addition to the ceria-based oxide particles which support the precious metal, the upper layer slurry can contain the optional components of the upper layer described above. The upper layer slurry of the present invention preferably includes a binder in a predetermined amount as the optional component.

The solvent, solid content, and slurry preparation method of the upper layer slurry are the same as those of the lower layer slurry described above.

The prepared upper layer is applied to the surface of the substrate having the lower layer formed thereon as described above, and after removing the solvent as necessary, heating and drying are carried out, followed by firing to form the upper layer, whereby the exhaust gas purification catalyst of the present invention can be obtained.

The coating method and the method of removing the solvent after coating are the same as those for forming the lower layer.

The firing after removing the solvent is carried out at a temperature of 400° C. to 750° C., preferably 450° C. to 600° C., for, for example, 0.5 to 48 hours, preferably 0.75 to 36 hours. Ambient air is sufficient as the atmosphere for this heating.

2. Second Production Method

[Substrate Forming Step]

The substrate forming step of the second production method of the present invention can be performed by, for example, the method described in Patent Literature 2, wherein first ceria-based oxide particles with small particle size and second ceria-based oxide particles with large particle size are used as a part or all of the metal oxide particles constituting the substrate.

When the lower layer constitutes a part of the substrate, the substrate can be obtained by specifically, for example, mixing the predetermined first ceria-based oxide particles and the large particles size second ceria-based oxide particles of the present invention as well as the other metal oxide particles, as necessary, further adding water and a binder, kneading, extruding, drying, and firing.

[Upper Layer Forming Step]

The upper layer forming step of the second production method can be carried out by, for example, applying the upper layer slurry prepared in the same manner as the first production method on the substrate obtained as described above, drying, and firing.

EXAMPLES

In the following, an alumina having an average particle diameter of 14 μm and a BET specific surface area of 100 m$^2$/g was used as the alumina, and a monolithic honeycomb substrate having a volume of 1 L was used as the substrate.

Verification of the Effect of the Configuration of the Present Invention

Example 1

(1) Forming the Lower Layer 50 g of a ceria-zirconia composite oxide having a $CeO_2$:$ZrO_2$ ratio of 35:65 (mass ratio) and a secondary particle diameter of 1 μm as the first CZ, 50 g of a ceria-zirconia composite oxide having a $CeO_2:ZrO_2$ ratio of 35:65 (mass ratio) and a secondary particle diameter of 30 μm as the second CZ, 100 g of alumina, and 300 g of water were mixed to prepare the lower layer slurry.

This lower layer slurry was applied onto the substrate and heated for 1 hour at 250° C. to form a lower layer (coating amount: 200 g/L) on the substrate.

(2) Forming the Upper Layer

A Rh-supporting CZ was obtained by immersing 50 g of a ceria-zirconia composite oxide having a $CeO_2:ZrO_2$ ratio of 20:80 (mass ratio) and a secondary particle diameter of 1 μm as the CZ for the upper layer in an aqueous solution containing 0.2 g/L equiv. of rhodium nitrate, heating for 1 hour at 250° C., and further firing for 1 hour at 500° C.

50 g of the Rh-supporting CZ obtained as described above, 50 g of alumina, and 100 g of water were mixed to prepare an upper layer slurry.

An exhaust gas purification catalyst was prepared by coating the upper layer slurry onto the substrate on which the lower layer has been formed, heating and drying for 1 hour at 250° C., and firing for 1 hour at 500° C. to form the upper layer (coating amount: 100 g/L).

(3) Measurement of the Particle Size of the Oxide Particles (SEM/EDX Analysis)

SEM/EDX analysis (scanning electron microscopy/energy-dispersive X-ray spectroscopy) were performed for each of the upper layer and the lower layer of the catalyst prepared as described above to measure the particle size of the CZ. The specific measurement methods are as described below.

Measurement Device: Model "S-4200" manufactured by Hitachi High-Technologies Corporation Evaluation Method: 100 fields of view were photographed for each of the upper layer and the lower layer under conditions of an acceleration voltage of 15 kV and a field magnification of 2,000×, and particle size distribution curves for each layer were obtained based on the number of particles as an average in a total of 500 regions in which 5 regions were set for each field of view. The maximum values of these particle size distribution curves were taken as the particle diameter. In Example 1, there was only one maximum value in the upper layer, and in the lower layer, two maximum values were observed.

(4) Evaluation of Exhaust Gas Purification Performance (4-1) Endurance

The catalyst obtained as described above was attached to a gasoline engine having a 4,000 cc displacement and endurance treatment was carried out for 20 hours under conditions of an average engine speed of 3,500 rpm and a gas temperature at the catalyst of 1,000° C.

(4-2) Performance Evaluation

The catalyst after undergoing the above endurance treatment was attached to a vehicle having a 700 cc displacement and run in accordance with JC08 mode, and the emissions of HC, CO, and $NO_X$ from the tailpipe were measured.

All of the above evaluation results are shown in Table 1.

Comparative Example 1

(1) Forming the Catalyst Layer 50 g of alumina was immersed in an aqueous solution containing 0.25 g/L equiv. of rhodium nitrate, heated at 250° C. for 1 hour, and further fired at 500° C. for 1 hour to obtain a Rh-supporting alumina. 50 g of the Rh-supporting alumina, 50 g of alumina (non-Rh-supporting), 50 g of a ceria-zirconia composite oxide having a $CeO_2:ZrO_2$ ratio of 35:65 (mass ratio) and a secondary particle diameter of 10 μm, and 300 g of water were mixed to prepare a catalyst layer slurry.

A catalyst layer (coating amount: 150 g/L) was formed by applying the catalyst layer slurry onto a substrate, heating and drying at 250° C. for 1 hour, and firing at 500° C. for 1 hour, whereby an exhaust gas purification catalyst was prepared.

(2) Evaluation

Using the exhaust gas purification catalyst prepared as described above, measurement of the particle size of the oxide particles and evaluation of the exhaust gas purification performance were carried out in the same manner as Example 1. The results are shown in Table 1.

Comparative Example 2

(1) Forming the Lower Layer 50 g of a ceria-zirconia composite oxide having a $CeO_2:ZrO_2$ ratio of 35:65 (mass ratio) and a secondary particle diameter of 3 μm as the first CZ, 50 g of a ceria-zirconia composite oxide having a $CeO_2:ZrO_2$ ratio of 35:65 (mass ratio) and a secondary particle size of 20 μm as the second CZ, 100 g of alumina, and 300 g of water were mixed to prepare a lower layer slurry.

The lower layer slurry was applied onto a substrate and heated at 250° C. for 1 hour to form a lower layer (coating amount: 200 g/L) on the substrate.

(2) Forming the Upper Layer 0.2 g/L equiv. of rhodium nitrate, 50 of alumina, and 100 g of water were mixed to prepare an upper layer slurry.

The upper layer (coating amount: 50 g/L) was formed by further coating the substrate on which the lower layer was formed with the upper layer slurry, heating and drying at 250° C. for 1 hour, and firing at 500° C. for 1 hour, whereby an exhaust gas purification catalyst was obtained.

(3) Evaluation

Using the exhaust gas purification catalyst prepared as described above, measurement of the particle size of the oxide particles and evaluation of the exhaust gas purification performance were carried out in the same manner as Example 1. The results are shown in Table 1.

Comparative Examples 3 to 5

(1) Catalyst Preparation

Lower layers (coating amount: 200 g/L) were formed on substrates in the same manner as in Example 1 except that CZs having the particle sizes described in Table 1 were used as the first CZ.

Rh-supporting CZs were prepared in the same manner as in Example 1 except that CZs having the particle sizes described in Table 1 were used as the CZ for the upper layer and exhaust gas purification catalysts were prepared by forming an upper layer (coating amount 100 g/L) on the substrate on which the lower layer was formed using the Rh-supporting CZ in the same manner as Example 1.

(2) Evaluation

Using the exhaust gas purification catalysts prepared as described above, measurement of the particle sizes of the oxide particles and evaluation of the exhaust gas purification performances were carried out in the same manner as Example 1. The results are shown in Table 1.

TABLE 1

| | Upper Layer | | | Lower Layer | | | | | | | |
|---|---|---|---|---|---|---|---|---|---|---|---|
| | | | | Precious Metal (g/L) | Ceria-based Oxide Particle | | | | Particle Ratio | Vehicle Evaluation Emissions (g/km) | | |
| | Precious Metal (g/L) | Ceria-based Oxide Particle Diameter (μm) | | | 1st Particle (μm) | | 2nd Particle (μm) | | (1st:2nd Mass Ratio) | | | |
| | Rh | Preparation | SEM | Pd | Rh | Preparation | SEM | Preparation | SEM | | CO | HC | $NO_x$ |
| Example 1 | 0.2 | 1 | 1.17 | — | — | 1 | 0.95 | 30 | 30.32 | 1:1 | 0.310 | 0.013 | 0.016 |
| Comparative Example 1 | Single-Layer Configuration | | | — | 0.25 | 10 | 9.82 | Not Used | — | | 0.373 | 0.028 | 0.024 |
| Comparative Example 2 | Single-Layer Configuration | | | — | 0.25 | 3 | 3.11 | 20 | 20.12 | 1:1 | 0.363 | 0.026 | 0.028 |
| Comparative Example 3 | 0.2 | 3 | 3.15 | — | — | 0.50 | 0.50 | Not Used | — | | 0.422 | 0.031 | 0.028 |
| Comparative Example 4 | 0.2 | 3 | 3.08 | — | — | 10 | 10.14 | Not Used | — | | 0.419 | 0.030 | 0.030 |
| Comparative Example 5 | 0.2 | 3 | 3.04 | — | — | 45 | 44.79 | Not Used | — | | 0.392 | 0.023 | 0.024 |

[Analysis of Table 1]

As can be seen from Table 1, the exhaust gas purification catalyst of Example 1, which had the configuration of the present invention was excellent in actual vehicle emissions characteristics as compared to the exhaust gas purification catalysts of Comparative Examples 1 and 2, which had a catalyst layer having a single layer configuration, as well as the exhaust gas purification catalysts of Comparative Examples 3 to 5, which had only one type of lower layer CZ. In particular, since the $NO_X$ emissions were reduced, it was verified that the exhaust gas purification catalyst of Example 1 effectively exhibited the effect expected of the present invention.

Furthermore, regarding the particles size of oxide particles, the values measured by the SEM/EDX analysis after forming the catalyst layers were in good agreement with the particle size at the time of preparation.

Effect of Particle Size of First CZ and Second CZ

Examples 2 to 16 and Comparative Examples 6 to 12

(1) Catalyst Preparation

Lower layers (coating amount: 200 g/L) were formed on a substrate in the same manner as in Example 1, except that CZs having the particle sizes described in Table 2 or 3 were used as the first CZ and second CZ, and the ratios thereof were as shown in Table 2 or Table 3.

Rh-supporting CZs were prepared in the same manner as in Example 1 except that CZs having the particle sizes described in Table 1 were used as the CZ for the upper layer and exhaust gas purification catalysts were prepared by forming an upper layer (coating amount 100 g/L) on the substrate on which the lower layer was formed using the Rh-supporting CZ in the same manner as Example 1.

(2) Evaluation

Using the exhaust gas purification catalysts prepared as described above, measurement of the particle sizes of the oxide particles and evaluation of the exhaust gas purification performances were carried out in the same manner as Example 1. The results are shown in Table 2 and Table 3.

Example 17

In this example, the effect of supporting a small amount of Rh on the second CZ in the lower layer was investigated.

(1) Forming the Lower Layer 50 g of a ceria-zirconia composite oxide having a $CeO_2$:$ZrO_2$ ratio of 35:65 (mass ratio) and a secondary particle diameter of 30 μm used as the second CZ was immersed in an aqueous solution containing 0.25 g/L equiv. of rhodium nitrate, heated at 250° C. for 1 hour, and further fired at 500° C. for 1 hour to obtain a Rh-supporting second CZ.

50 g of a ceria-zirconia composite oxide having a $CeO_2$:$ZrO_2$ ratio of 35:65 (mass ratio) and a secondary particle diameter of 1 μm as the first CZ, 50 g of the Rh-supporting second CZ described above as the second CZ, 50 g of alumina, and 200 g of water were mixed to prepare the lower layer slurry.

The lower layer slurry was applied onto a substrate and heated at 250° C. for 1 hour to form a lower layer (coating amount: 150 g/L) on the substrate.

(2) Forming the Upper Layer

An exhaust gas purification catalyst was prepared by preparing a Rh-supporting CZ in the same manner as in Example 1 except that a CZ having a $CeO_2$:$ZrO_2$ ratio of 20:80 (mass ratio) and a secondary particle diameter of 3 μm was used as the upper layer CZ and forming an upper layer (coating amount: 100 g/L) on the substrate on which the lower layer was formed.

(3) Evaluation

Using the exhaust gas purification catalyst prepared as described above, measurement of the particle size of the oxide particles and evaluation of the exhaust gas purification performance were carried out in the same manner as Example 1. The results are shown in Table 3.

TABLE 2

| | Upper Layer | | Lower Layer | | | | | | | | |
|---|---|---|---|---|---|---|---|---|---|---|---|
| | | | | Ceria-based Oxide Particle | | | | | Vehicle Evaluation | | |
| | Precious Metal (g/L) | Ceria-based Oxide Particle Diameter (μm) | | Precious Metal (g/L) | | 1st Particle (μm) | | 2nd Particle (μm) | | Particle Ratio (1st:2nd Mass Ratio) | Emissions (g/km) |
| | Rh | Preparation | SEM | Pd | Rh | Preparation | SEM | Preparation | SEM | | CO HC NO$_x$ |
| Example 1 | 0.2 | 1 | 1.17 | — | — | 1 | 0.95 | 30 | 30.32 | 1:1 | 0.310 0.013 0.016 |
| Example 2 | 0.2 | 1 | 0.92 | — | — | 1 | 1.01 | 10 | 9.82 | 1:1 | 0.329 0.014 0.016 |
| Example 3 | 0.2 | 5 | 5.13 | — | — | 1 | 1.09 | 10 | 9.71 | 1:1 | 0.308 0.016 0.017 |
| Example 4 | 0.2 | 5 | 4.81 | — | — | 1 | 0.97 | 30 | 29.76 | 1:1 | 0.338 0.016 0.014 |
| Example 5 | 0.2 | 1 | 0.88 | — | — | 3 | 2.96 | 20 | 19.79 | 1:1 | 0.328 0.014 0.013 |
| Example 6 | 0.2 | 5 | 4.88 | — | — | 3 | 3.05 | 20 | 20.08 | 1:1 | 0.282 0.011 0.012 |
| Example 7 | 0.2 | 3 | 2.98 | — | — | 3 | 3.01 | 20 | 20.10 | 1:1 | 0.298 0.010 0.011 |
| Example 8 | 0.2 | 3 | 2.98 | — | — | 3 | 3.07 | 20 | 20.19 | 1:3 | 0.308 0.010 0.013 |
| Example 9 | 0.2 | 3 | 2.98 | — | — | 3 | 3.07 | 20 | 20.19 | 3:7 | 0.310 0.010 0.012 |
| Example 10 | 0.2 | 3 | 2.98 | — | — | 3 | 3.07 | 20 | 20.19 | 7:3 | 0.304 0.009 0.010 |
| Example 11 | 0.2 | 3 | 2.96 | — | — | 3 | 2.86 | 20 | 19.87 | 4:1 | 0.323 0.028 0.023 |
| Example 12 | 0.2 | 1 | 1.12 | — | — | 5 | 5.11 | 10 | 9.89 | 1:1 | 0.329 0.014 0.016 |

TABLE 3

| | Upper Layer | | Lower Layer | | | | | | | | |
|---|---|---|---|---|---|---|---|---|---|---|---|
| | | | | Ceria-based Oxide Particle | | | | | Vehicle Evaluation | | |
| | Precious Metal (g/L) | Ceria-based Oxide Particle Diameter (μm) | | Precious Metal (g/L) | | 1st Particle (μm) | | 2nd Particle (μm) | | Particle Ratio (1st:2nd Mass Ratio) | Emissions (g/km) |
| | Rh | Preparation | SEM | Pd | Rh | Preparation | SEM | Preparation | SEM | | CO HC NO$_x$ |
| Example 13 | 0.2 | 5 | 5.21 | — | — | 5 | 5.03 | 10 | 10.19 | 1:1 | 0.308 0.016 0.012 |
| Example 14 | 0.2 | 1 | 0.96 | — | — | 5 | 5.04 | 30 | 30.21 | 1:1 | 0.328 0.014 0.013 |
| Example 15 | 0.2 | 5 | 5.01 | — | — | 5 | 5.05 | 30 | 29.83 | 1:1 | 0.310 0.013 0.016 |
| Example 16 | 0.2 | 3 | 3.02 | — | — | 6 | 6.14 | 30 | 30.17 | 1:1 | 0.336 0.022 0.021 |
| Example 17 | 0.2 | 3 | 2.95 | — | 0.25 | 1 | 1.07 | 20 | 20.35 | 1:1 | 0.340 0.024 0.021 |
| Comparative Example 6 | 0.2 | 3 | 2.96 | — | — | 0.5 | 0.53 | 10 | 9.86 | 1:1 | 0.388 0.029 0.026 |
| Comparative Example 7 | 0.2 | 3 | 3.11 | — | — | 1 | 1.11 | 2 | 2.04 | 1:1 | 0.431 0.031 0.029 |
| Comparative Example 8 | 0.2 | 3 | 2.99 | — | — | 1 | 0.96 | 9 | 9.15 | 1:1 | 0.446 0.031 0.029 |
| Comparative Example 9 | 0.2 | 3 | 2.93 | — | — | 5 | 5.14 | 6 | 6.10 | 1:1 | 0.395 0.032 0.028 |
| Comparative Example 10 | 0.2 | 3 | 2.89 | — | — | 5 | 5.06 | 35 | 35.22 | 1:1 | 0.445 0.029 0.028 |
| Comparative Example 11 | 0.2 | 3 | 3.14 | — | — | 5 | 4.93 | 45 | 44.89 | 1:1 | 0.374 0.034 0.030 |
| Comparative Example 12 | 0.2 | 3 | 3.09 | — | — | 25 | 25.42 | 30 | 29.66 | 1:1 | 0.461 0.033 0.029 |

[Analysis of Table 2 and Table 3]

The exhaust gas purification catalysts of Examples 1 to 17, in which the particle diameters of the first CZ and the second CZ in the lower layer of the catalyst were within the ranges specified by the present invention, were excellent in actual vehicle emissions characteristics, especially NO$_X$ emissions characteristics. The catalyst of Example 17, which included a small amount (0.25 g/L) of Rh in the lower layer, also exhibited excellent emissions characteristics.

In connection thereto, it was found that the catalyst of Comparative Examples 6 and 13, in which the particle diameters of the first CZ were outside the range specified by the present invention, and Comparative Examples 7 to 11, in which the particle diameters of the second CZ were outside the range specified by the present invention, were inferior in emissions characteristics.

When a Precious Metal (Pd) is Included in Lower Layer

Example 18

(1) Forming the Lower Layer 50 g of a ceria-zirconia composite oxide having a CeO$_2$:ZrO$_2$ ratio of 35:65 (mass ratio) and a secondary particle diameter of 1 μm used as the first CZ was immersed in an aqueous solution containing 0.25 g/L equiv. of palladium nitrate, heated at 250° C. for 1 hour, and further fired at 500° C. for 1 hour to obtain a Pd-supporting first CZ.

50 g of the Pd-supporting first CZ described above as the first CZ, 50 g of a ceria-zirconia composite oxide having a CeO$_2$:ZrO$_2$ ratio of 35:65 (mass ratio) and a secondary particle diameter of 30 μm as the second CZ, 50 g of alumina, and 200 g of water were mixed to prepare a lower layer slurry.

The lower layer slurry was applied onto a substrate and heated at 250° C. for 1 hour to form a lower layer (coating amount: 150 g/L) on the substrate.

(2) Forming the Upper Layer

An exhaust gas purification catalyst was prepared by forming an upper layer (coating amount: 100 g/L) on the substrate on which the lower layer was formed in the same manner as Example 1.

(3) Evaluation

Using the exhaust gas purification catalyst prepared as described above, measurement of the particle size of the oxide particles and evaluation of the exhaust gas purification performance were carried out in the same manner as Example 1. The results are shown in Table 4 along with the results of Example 1.

Examples 19 to 31

(1) Lower Layer Preparation

Lower Layers (coating amount: 200 g/L) were formed on substrates in the same manner as Example 18 except that the CZs having the particle sizes shown in Table 4 were used as the first CZ and the second CZ at the proportions shown in Table 4.

(2) Forming the Upper Layer

Exhaust gas purification catalysts were prepared by forming an upper layer (coating amount: 100 g/L) on the substrate on which the lower layer was formed in the same manner as Example 1.

(3) Evaluation

Using the exhaust gas purification catalysts prepared as described above, measurement of the particle sizes of the oxide particles and evaluation of the exhaust gas purification performances were carried out in the same manner as Example 1. The results are shown in Table 4.

Comparative Example 13

(1) Forming the Lower Layer 0.25 g/L equiv. of palladium nitrate, 50 g of alumina, and 200 g of water were mixed to prepare a lower layer slurry.

The lower layer slurry was applied onto a substrate and heated at 250° C. for 1 hour to form a lower layer on the substrate.

(2) Forming the Upper Layer

An exhaust gas purification catalyst was prepared by forming an upper layer (coating amount: 100 g/L) on the substrate on which the lower layer was formed in the same manner as Example 1.

(3) Evaluation

Using the exhaust gas purification catalyst prepared as described above, measurement of the particle size of the oxide particles and evaluation of the exhaust gas purification performance were carried out in the same manner as Example 1. The results are shown in Table 4.

TABLE 4

| | Upper Layer | | Lower Layer | | | | | | | | |
|---|---|---|---|---|---|---|---|---|---|---|---|
| | | | | | Ceria-based Oxide Particle | | | | | Vehicle Evaluation | |
| | Precious Metal (g/L) | Ceria-based Oxide Particle Diameter (μm) | | Precious Metal (g/L) | | 1st Particle (μm) | | 2nd Particle (μm) | | Particle Ratio (1st:2nd Mass | Emissions (g/km) | |
| | Rh | Preparation | SEM | Pd | Rh | Preparation | SEM | Preparation | SEM | Ratio) | CO | HC | NO$_x$ |
| Example 1 | 0.2 | 1 | 1.17 | — | — | 1 | 0.95 | 30 | 30.32 | 1:1 | 0.310 | 0.013 | 0.016 |
| Example 18 | 0.2 | 1 | 1.05 | 0.25 | — | 1 | 0.93 | 30 | 30.13 | 1:1 | 0.240 | 0.008 | 0.008 |
| Example 19 | 0.2 | 5 | 5.07 | 0.25 | — | 1 | 0.94 | 10 | 9.85 | 1:1 | 0.323 | 0.012 | 0.012 |
| Example 20 | 0.2 | 5 | 4.94 | 0.25 | — | 1 | 1.02 | 30 | 29.82 | 1:1 | 0.298 | 0.010 | 0.011 |
| Example 21 | 0.2 | 1 | 1.08 | 0.25 | — | 1 | 1.04 | 10 | 10.06 | 1:1 | 0.236 | 0.007 | 0.008 |
| Example 22 | 0.2 | 1 | 0.99 | 0.25 | — | 3 | 2.97 | 20 | 20.14 | 1:1 | 0.323 | 0.012 | 0.012 |
| Example 23 | 0.2 | 3 | 3.11 | 0.25 | — | 3 | 2.98 | 20 | 19.82 | 1:1 | 0.338 | 0.016 | 0.014 |
| Example 24 | 0.2 | 3 | 3.06 | 0.25 | — | 3 | 2.91 | 20 | 20.20 | 1:1 | 0.308 | 0.016 | 0.012 |
| Example 25 | 0.2 | 3 | 2.93 | 0.25 | — | 3 | 2.89 | 20 | 19.73 | 1:1 | 0.240 | 0.008 | 0.008 |
| Example 26 | 0.2 | 3 | 2.94 | 0.25 | — | 3 | 3.11 | 20 | 19.94 | 3:1 | 0.313 | 0.016 | 0.017 |
| Example 27 | 0.2 | 5 | 4.92 | 0.25 | — | 3 | 2.94 | 20 | 19.88 | 1:1 | 0.220 | 0.009 | 0.009 |
| Example 28 | 0.2 | 5 | 4.97 | 0.25 | — | 5 | 4.88 | 10 | 10.07 | 1:1 | 0.282 | 0.011 | 0.012 |
| Example 29 | 0.2 | 5 | 5.10 | 0.25 | — | 5 | 4.93 | 30 | 30.10 | 1:1 | 0.308 | 0.016 | 0.012 |
| Example 30 | 0.2 | 1 | 1.06 | 0.25 | — | 5 | 5.08 | 10 | 9.95 | 1:1 | 0.220 | 0.009 | 0.009 |
| Example 31 | 0.2 | 1 | 0.82 | 0.25 | — | 5 | 4.99 | 30 | 29.36 | 1:1 | 0.236 | 0.007 | 0.008 |
| Comparative Example 13 | 0.2 | 3 | 2.93 | 0.25 | — | Not Used | | Not Used | | — | 0.461 | 0.036 | 0.028 |

[Analysis of Table 4]

When the exhaust gas purification catalyst of the present invention contained Pd in the lower layer, the actual vehicle emission characteristics further improved (Examples 18 to 31). It is thought that this is due to an increase in total amount of precious metal. However, Comparative Example 13 is an example of increasing the content of precious metal in the catalyst of the prior art. The emission characteristics thereof were not improved, but rather were inferior as compared to the catalyst of Example 1, in which the amount of precious metal was small.

The results of Table 4 prove that the catalyst structure of the present invention is extremely effective.

The invention claimed is:

1. An exhaust gas purification catalyst, comprising a lower layer containing ceria-based oxide particles and an upper layer containing metal oxide particles and a precious metal supported on the metal oxide particles, wherein the Rh content of the lower layer is not more than 0.25 g/L, and a particle-size distribution of the ceria-based oxide particles in the lower layer, as obtained by scanning electron microscopy, has a first peak in which a peak top thereof is in a region of 0.90 to 6.50 µm and a second peak in which the peak top thereof is in a region of 9.50 to 34.0 µm.

2. The exhaust gas purification catalyst according to claim 1, wherein the metal oxide particles in the upper layer are ceria-based oxide particles having an average particle diameter of 0.75 µm to 5.5 µm.

3. The exhaust gas purification catalyst according to claim 1, wherein the precious metal included in the upper layer is Rh.

4. The exhaust gas purification catalyst according to claim 1, wherein the lower layer further comprises Pd.

5. The exhaust gas purification catalyst according to claim 4, wherein the Pd is supported on the ceria-based oxide particles associated with the first peak.

6. The exhaust gas purification catalyst according to claim 1, wherein the lower layer is formed on a substrate.

7. The exhaust gas purification catalyst according to claim 1, wherein the lower layer constitutes a part of a substrate and the upper layer is on the substrate.

8. A method for the production of an exhaust gas purification catalyst, comprising the steps of:

forming, on a substrate, a lower layer containing first ceria-based oxide particles having a peak top in a region of 0.90 to 6.50 µm and second ceria-based oxide particles having a peak top in the region of 9.50 to 34.0 µm, in a particle diameter distribution obtained by scanning electron microscopy, and forming an upper layer containing metal oxide particles and a precious metal supported on the metal oxide particles.

9. A method for the production of an exhaust gas purification catalyst, comprising the steps of:

forming a substrate, forming, on the substrate, an upper layer containing metal oxide particles and a precious metal supported on the metal oxide particles, wherein a part or all of the substrate is composed of a lower layer containing first ceria-based oxide particles having a peak top in a region of 0.90 to 6.50 µm and second ceria-based oxide particles having a peak top in the region of 9.50 to 34.0 µm, in a particle diameter distribution obtained by scanning electron microscopy.

* * * * *